(12) United States Patent
Takahashi et al.

(10) Patent No.: US 7,373,053 B2
(45) Date of Patent: May 13, 2008

(54) OPTICAL FIBER ARRAY AND MANUFACTURING METHOD THEREOF

(75) Inventors: Fumio Takahashi, Chiba (JP); Kiyoshi Kurumada, Chiba (JP); Ken Kiriya, Chiba (JP)

(73) Assignee: Seikoh Giken Co., Ltd., Chiba (JP)

( * ) Notice: Subject to any disclaimer, the term of this patent is extended or adjusted under 35 U.S.C. 154(b) by 0 days.

(21) Appl. No.: 11/605,774

(22) Filed: Nov. 28, 2006

(65) Prior Publication Data
US 2007/0122085 A1    May 31, 2007

(30) Foreign Application Priority Data
Nov. 28, 2005    (JP)    ............... 2005-342027

(51) Int. Cl.
*G02B 6/26*    (2006.01)
(52) U.S. Cl. ................. 385/52; 385/137; 385/16
(58) Field of Classification Search ............ None
See application file for complete search history.

(56) References Cited
U.S. PATENT DOCUMENTS

| | | | | |
|---|---|---|---|---|
| 4,952,263 | A * | 8/1990 | Kakii et al. ............. | 156/153 |
| 5,812,726 | A * | 9/1998 | Jinnai et al. ............. | 385/137 |
| 6,045,269 | A * | 4/2000 | Watanabe et al. ......... | 385/59 |
| 6,243,520 | B1 * | 6/2001 | Goldman ................. | 385/115 |
| 2002/0186954 | A1 * | 12/2002 | Liu et al. ................ | 385/137 |
| 2002/0197026 | A1 * | 12/2002 | Kato et al. .............. | 385/92 |
| 2003/0026562 | A1 * | 2/2003 | Takahashi ................ | 385/114 |
| 2003/0152328 | A1 * | 8/2003 | Trott ..................... | 385/49 |
| 2004/0165854 | A1 * | 8/2004 | Niiyama et al. .......... | 385/137 |
| 2005/0117863 | A1 * | 6/2005 | Fabian et al. ............ | 385/123 |

FOREIGN PATENT DOCUMENTS
JP    2005181724    7/2005

OTHER PUBLICATIONS

Japanese Industrial Standard (JIS) C 6835, May 2005, Japanese Standards Association, 2005 edition, whole document.*
Japanese Industrial Standard C 6835 (translated to English); 2005.

* cited by examiner

*Primary Examiner*—Sung Pak
*Assistant Examiner*—Chad H Smith
(74) *Attorney, Agent, or Firm*—Carlson, Gaskey & Olds

(57) ABSTRACT

The present invention provides a high-density and high-precision optical fiber array which can stably be manufactured with excellent operability and which can maintain excellent characteristics while suppressing insertion loss with respect to optical parts by optimizing constituent parts of the high-density optical fiber array. The present invention also provides a manufacturing method of the optical fiber array. According to the optical fiber array, a plurality of V-grooves are formed in a V-groove substrate in parallel to each other. A plurality of optical fibers whose end coatings are removed are aligned in the V-grooves. The optical fibers are fixed, using an adhesive, between the V-groove substrate and a lid plate to be placed on the optical fibers. In the optical fiber array, an average value of pitches of the V-grooves is substantially equal to an average value of outer diameters of the optical fibers. A radius of curvature of fiber curl of each optical fiber is 8 meters or more.

6 Claims, 3 Drawing Sheets

FIG. 4

| MINIMUM THICKNESS OF ADHESIVE LAYER | MAXIMUM DEVIATION OF OUTER DIAMETER Δd [μm] OF OPTICAL FIBER | MAXIMUM VALUE OF CORE ECCENTRICITY Δe [μm] OF OPTICAL FIBER | MAXIMUM VALUE OF Δd+Δe [μm] OF EACH OPTICAL FIBER | PEELING TEST | TRANSMISSION CHARACTERISTICS |
|---|---|---|---|---|---|
| LESS THAN 5nm | 0.3 OR LESS | 0.4 OR LESS | 0.5 OR LESS | × | ⊖ |
| | | | GREATER THAN 0.5 | × | △ |
| | | GREATER THAN 0.4 | 0.5 OR LESS | × | ○ |
| | | | GREATER THAN 0.5 | × | △ |
| | GREATER THAN 0.3 | 0.4 OR LESS | 0.5 OR LESS | × | ○ |
| | | | GREATER THAN 0.5 | × | △ |
| | | GREATER THAN 0.4 | 0.5 OR LESS | × | ○ |
| | | | GREATER THAN 0.5 | × | × |
| 5nm | 0.3 OR LESS | 0.4 OR LESS | 0.5 OR LESS | ○ | ⊖ |
| | | | GREATER THAN 0.5 | ○ | △ |
| | | GREATER THAN 0.4 | 0.5 OR LESS | ○ | ○ |
| | | | GREATER THAN 0.5 | ○ | △ |
| | GREATER THAN 0.3 | 0.4 OR LESS | 0.5 OR LESS | ○ | ○ |
| | | | GREATER THAN 0.5 | ○ | △ |
| | | GREATER THAN 0.4 | 0.5 OR LESS | ○ | ○ |
| | | | GREATER THAN 0.5 | ○ | × |
| 125nm | 0.3 OR LESS | 0.4 OR LESS | 0.5 OR LESS | ○ | ⊖ |
| | | | GREATER THAN 0.5 | ○ | △ |
| | | GREATER THAN 0.4 | 0.5 OR LESS | ○ | ○ |
| | | | GREATER THAN 0.5 | ○ | △ |
| | GREATER THAN 0.3 | 0.4 OR LESS | 0.5 OR LESS | ○ | ○ |
| | | | GREATER THAN 0.5 | ○ | △ |
| | | GREATER THAN 0.4 | 0.5 OR LESS | ○ | ○ |
| | | | GREATER THAN 0.5 | ○ | × |
| 900nm | 0.3 OR LESS | 0.4 OR LESS | 0.5 OR LESS | ○ | ○ |
| | | | GREATER THAN 0.5 | ○ | △ |
| | | GREATER THAN 0.4 | 0.5 OR LESS | ○ | △ |
| | | | GREATER THAN 0.5 | ○ | △ |
| | GREATER THAN 0.3 | 0.4 OR LESS | 0.5 OR LESS | ○ | △ |
| | | | GREATER THAN 0.5 | ○ | △ |
| | | GREATER THAN 0.4 | 0.5 OR LESS | ○ | △ |
| | | | GREATER THAN 0.5 | ○ | △ |
| 1200nm | 0.3 OR LESS | 0.4 OR LESS | 0.5 OR LESS | ○ | △ |
| | | | GREATER THAN 0.5 | ○ | × |
| | | GREATER THAN 0.4 | 0.5 OR LESS | ○ | △ |
| | | | GREATER THAN 0.5 | ○ | × |
| | GREATER THAN 0.3 | 0.4 OR LESS | 0.5 OR LESS | ○ | △ |
| | | | GREATER THAN 0.5 | ○ | × |
| | | GREATER THAN 0.4 | 0.5 OR LESS | ○ | △ |
| | | | GREATER THAN 0.5 | ○ | × |

OPTICAL FIBER ARRAY AND MANUFACTURING METHOD THEREOF

CROSS-REFERENCE TO RELATED APPLICATION

This application is based upon and claims the benefit of priority from the prior Japanese Patent Application No. 2005-342027, filed on Nov. 28, 2005; the entire contents of which are incorporated herein by reference.

BACKGROUND OF THE INVENTION

1. Field of the Invention

The present invention relates to an optical fiber array and a manufacturing method thereof.

2. Description of the Related Art

In recent years, optical fibers have become a focus of attention especially in a communication field. Particularly, in the field of IT (information technology), a communication technology using the optical fibers is required for improvement of a high speed Internet network.

The optical fiber has characteristics of low loss, high band, thin diameter, light weight, noninductivity, resource saving, and the like. Therefore, in a communication system using such optical fiber, the number of repeaters can largely be reduced and construction and maintenance can be facilitated as compared with a communication system using a conventional metallic cable. As a result, cost efficiency and reliability of the communication system can be enhanced.

The optical fiber can not only transmit light of one wavelength, but also transmit light having many different wavelengths at the same time with one optical fiber in a multiplex manner. Therefore, it is possible to realize a large-capacity transmission which is applicable to a wide range of uses, and there is a great merit that the optical fiber can be used for video services and the like.

In an optical communication using the optical fiber, an optical fiber ribbon in which a plurality of optical fibers are disposed in parallel and covered with a resin layer is used. An optical fiber array in which a plurality of optical fibers are aligned at predetermined distances from one another is usually used for connecting the optical fiber ribbon with light receiving elements, light emitting elements, and various terminal equipment (such as a personal computer, a mobile device, and a game). The optical fiber array is formed by removing the coating resin layer of an end of the optical fiber ribbon, exposing ends of the optical fibers, disposing and fixing the exposed optical fibers in V-grooves of a substrate, and mounting a lid for covering the exposed optical fibers on the substrate by an adhesive layer.

Such an optical fiber array is manufactured in the following manner as disclosed in, for example, Japanese Patent Application Laid-Open No. 2005-181724. A V-groove substrate is provided with a plurality of V-grooves for positioning optical fibers by which a plurality of optical fibers are disposed in parallel. A plurality of optical fibers are disposed in parallel on the V-groove substrate such that tip ends of the optical fibers project from an end surface of the V-groove substrate. Next, a lid is placed on an opening side (upper side) of the V-groove substrate, and the optical fibers are sandwiched between the V-groove substrate and the lid. Then, adhesive is applied to the projections of the optical fibers projecting from the sandwiching portion of the V-groove and the lid plate, and the adhesive is infiltrated into the sandwiching portion by a surface tension of the adhesive. Thereafter, the adhesive is cured, and the optical fibers are fixed to the V-groove substrate. Then, the projections of the optical fibers are removed, and the end surfaces of the optical fiber are aligned with the end surface of the V-groove substrate.

Recently, however, further increase in the density of the optical fiber array is required. For example, it is required that a substrate is formed such that the average value of pitches of maximum 48 grooves becomes substantially equal to an outer diameter "d" of the optical fibers (in a range of 1.0 times to 1.1 times of "d"), and optical fibers are mounted on the substrate to form the optical fiber array. The pitch of the grooves means a distance between adjacent V-grooves, and the average value of the pitches of the grooves means the average value of a plurality of grooves formed on one substrate.

An attempt is made to produce such an optical fiber array using a conventional method, according to Japanese Patent Application Laid-open No. 2005-181724. However, there are sometimes difficulties in assembling the members, and even when the members can be assembled excellently, insertion loss with a PLC (Planar Lightwave Circuit) is increased in some cases.

This is because in the conventional optical fiber array, attention is paid only on the management of size precision of the V-groove substrate and the lid, and no attention is paid to the geometric parameters of the "optical fiber" itself which is a constituent part of the optical fiber array together with the V-groove substrate and the lid. For example, even if an optical fiber is specified with an outer diameter as "125 µm", the numeric value of 125 µm is a nominal value, and in an actual case, optical fibers have various outer diameters in a range of 124 µm to 126 µm as described in JIS (Japanese Industrial Standards)_C6835. Therefore, even if the size precisions of the V-groove substrate and the lid are managed in submicron unit, if the geometric parameters of the optical fiber itself is not managed precisely, desired transmission characteristics of the optical fiber array cannot be achieved.

SUMMARY OF THE INVENTION

The present invention has been achieved to solve the above problem, and it is an object of the invention to provide an optical fiber array and a manufacturing method thereof in which constituent parts of a high-density optical fiber array are optimized so that a high-density and high-precision optical fiber array can be stably manufactured with excellent operability, insertion loss with respect to optical parts can be suppressed, and excellent characteristics can be maintained.

Terms used in this specification are defined in JIS (Japanese Industrial Standards)_C6835, unless otherwise specified.

According to one aspect of the present invention, there is provided an optical fiber array comprising:

a V-groove substrate having a plurality of V-grooves in parallel to each other;

a lid plate; and a plurality of optical fibers which are aligned between the V-grooves and the lid plate, and fixed by an adhesive, wherein pitches of the V-grooves are substantially equal to an average outer diameter "d" of the optical fibers, and a radius of curvature of fiber curl of each optical fiber is 8 meters or more.

According to another aspect of the present invention, there is provided an optical fiber array, wherein an average value of the pitches of the V-grooves is in a range of 1.0 times to 1.1 times an average value of the outer diameters of the optical fibers.

According to a still another aspect of the present invention, there is provided an optical fiber array, wherein a deviation "Δd" of the outer diameter of each optical fiber from the average value "d" of the outer diameters of the optical fibers is 0.3 μm or less.

According to a still another aspect of the present invention, there is provided an optical fiber array, wherein a core eccentricity "Δe" of each optical fiber is 0.4 μm or less.

According to a still another aspect of the present invention, there is provided an optical fiber array, wherein a sum of the core eccentricity "Δe" and the deviation "Δd" from an average value "d" of the outer diameters of each optical fiber is 0.5 μm or less.

According to a still another aspect of the present invention, there is provided an optical fiber array, wherein a minimum value of thicknesses of an adhesive layer among the V-groove substrate, the lid plate, and the optical fibers is in a range of 5 nm to 1,000 nm.

According to a still another aspect of the present invention, there is provided an optical fiber array, wherein a minimum value of thicknesses of the adhesive layer between the V-grooves of the V-groove substrate and the optical fibers is in a range of 5 nm to 1,000 nm, and a minimum value of thicknesses of the adhesive layer between the lid plate and the optical fibers is in a range of 5 nm to 500 nm.

According to a still another aspect of the present invention, there is provided an optical fiber array, wherein the adhesive is ultraviolet rays-cured type or thermally cured type resin having viscosity before curing of 0.1 to 3.0 Pa·s (100 to 3,000 cP (cps)).

According to a still another aspect of the present invention, there is provided an optical fiber array, wherein the adhesive is ultraviolet rays-cured type or thermally cured type epoxy-based resin having Young's modulus after curing of 500 MPa or higher, and a curing shrinkage ratio of 5% or less.

According to a still another aspect of the present invention, there is provided a manufacturing method of an optical fiber array including the steps of:

aligning a plurality of optical fibers, each having a radius of curvature of fiber curl of 8 meters or more, in a plurality of V-grooves formed in parallel to each other in a V-groove substrate at pitches which are substantially equal to outer diameters of the optical fibers in a state where tip ends of the optical fibers project from an end surface of the V-groove substrate;

placing a lid plate on the optical fibers and applying a first load to the optical fibers, thereby sandwiching the optical fibers between the V-groove substrate and the lid plate;

applying an adhesive to projecting portions of the optical fibers projecting from end surfaces of the V-groove substrate and the lid plate, and infiltrating the adhesive, by its surface tension, into a space formed by the V-groove substrate and the lid plate which sandwich the optical fibers;

curing the adhesive while applying a second load which is greater than the first load to the lid plate, thereby integrally fixing the optical fibers to the V-groove substrate and the lid plate; and removing the projecting portions of the optical fibers, and aligning end surfaces of the optical fibers with end surface of the V-groove substrate and the lid plate.

BRIEF DESCRIPTION OF THE ACCOMPANYING DRAWINGS

These and other objects and the configuration of this invention will become clearer from the following description of the preferred embodiments, read in connection with the accompanying drawings in which:

FIG. 4 is a table showing results of evaluation of a peel test and transmission characteristics using samples of the optical fiber array.

DETAILED DESCRIPTION OF THE INVENTION

Embodiments of the present invention will be explained with reference to the drawings.

Figure 1:
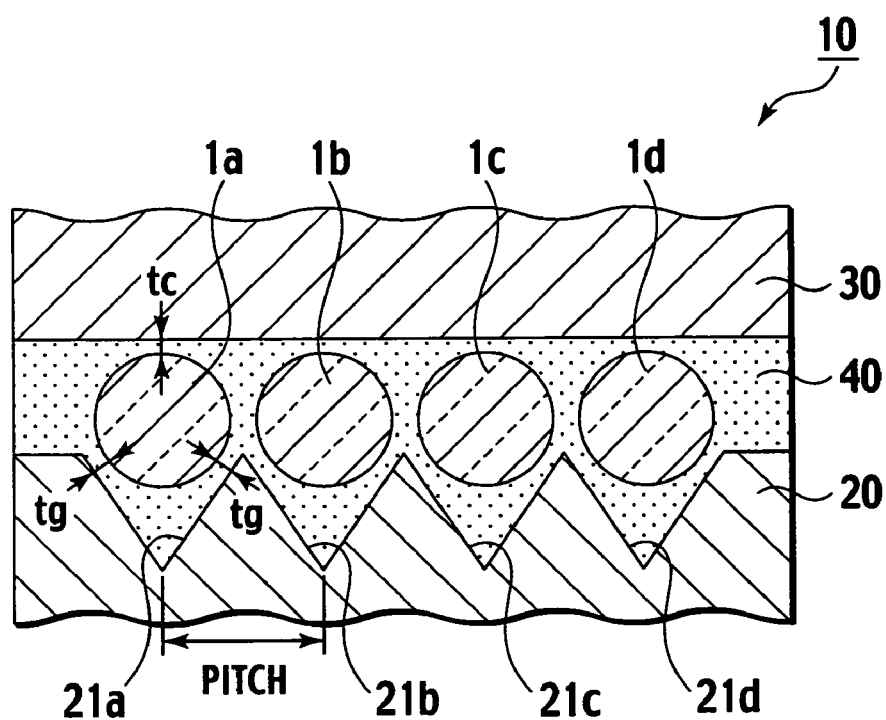
FIG. 1 is a schematic diagram of end surfaces of an optical fiber array according to one embodiment of the present invention.

FIG. 1 is a schematic diagram of end surfaces of an optical fiber array according to one embodiment of the present invention. This optical fiber array 10 includes a plurality of, for example, four optical fibers.

That is, in the optical fiber array 10, a plurality of (four) V-grooves 21a, 21b, 21c, and 21d are formed in parallel to each other on a V-groove substrate 20, and a plurality of (four) optical fibers 1a, 1b, 1c, and 1d (see FIG. 2) are arranged in alignment in the V-grooves 21a, 21b, 21c, and 21d. Coatings of ends of the optical fibers 1a, 1b, 1c, and 1d are removed. The optical fibers 1a, 1b, 1c, and 1d are fixed between the V-groove substrate 20 and a lid plate 30 placed on the optical fibers 1a, 1b, 1c, and 1d by an adhesive 40.

An opening angle of each of the V-grooves 21a, 21b, 21c, and 21d formed on the V-groove substrate 20 is 60° for example. A radius of each of the optical fibers 1a, 1b, 1c, and 1d is 62.5 μm for example.

According to the optical fiber array 10, the average value of pitches of the V-grooves 21a, 21b, 21c, and 21d is substantially equal to the average value of outer diameters of the optical fibers 1a, 1b, 1c, and 1d.

For example, the average value of the pitches of the V-grooves 21a, 21b, 21c, and 21d is in a range of 1.0 times to 1.1 times the average value of the outer diameters d of the optical fibers 1a, 1b, 1c, and 1d.

In this case, a radius of curvature of fiber curl of each of the optical fibers 1a, 1b, 1c, and 1d need to be 8 m or more. If the radius of curvature of the fiber curl is less than 8 m, the optical fibers 1a, 1b, 1c, and 1d are prone to be positioned above the adjacent V-grooves rather than on predetermined corresponding V-grooves when the optical fibers 1a, 1b, 1c, and 1d are mounted on the V-grooves 21a, 21b, 21c, and 21d, and the assembling operability is greatly deteriorated.

The fiber curl of each of the optical fibers 1a, 1b, 1c, and 1d is measured by a measuring method described in JIS_C6821. The fiber curl means a radius of curvature of the optical fiber in its free state from which coatings of optical fibers are removed.

It is preferable that in the optical fiber array 10, the optical fibers 1a, 1b, 1c, and 1d have a mode field diameter as described in JIS C6835, which is mentioned above. For example, the mode field diameter of each of the optical fibers 1a, 1b, 1c, and 1d is greater than 7 μm at a wavelength of 1550 nanometers as in JIS C6835, which is suitable for use in a communication system having light receiving elements, light emitting elements, and various terminal equipment (such as a personal computer, a mobile device, and a game).

When the optical fiber array 10 includes n optical fibers, the average value dave of the outer diameters of the optical fibers is dave=Σdi/n (i=1 to n). A deviation "Δdi" from the average value of the outer diameter of the i-th optical fiber is Δdi=|di−dave|.

It is preferable that a core eccentricity "Δe" of each optical fiber 1a, 1b, 1c, and 1d is 0.4 µm or less.

It is preferable that in the optical fiber array 10, the sum of the deviation "Δd" of the outer diameter of each optical fiber from the average value of the outer diameters of the optical fibers 1a, 1b, 1c, and 1d and the core eccentricity "Δe" is 0.5 µm or less.

If the conditions of the deviation "Δd" and the core eccentricity "Δe" are satisfied, it is effective to suppress the variation in the optical fibers 1a, 1b, 1c, and 1d constituting the optical fiber array 10. This facilitates the assembling operability when the optical fibers 1a, 1b, 1c, and 1d are mounted on the V-grooves 21a, 21b, 21c, and 21d.

In the optical fiber array 10, it is preferable that the minimum value of thicknesses tg and tc of a layer of the adhesive 40 between the V-groove substrate 20, the lid plate 30, and the optical fibers 1a, 1b, 1c, and 1d is 5 nm to 1,000 nm.

It is preferable that the minimum value of the thickness tg of the layer of the adhesive 40 between the V-grooves 21a, 21b, 21c, and 21d of the V-groove substrate 20 and the optical fibers 1a, 1b, 1c, and 1d is 5 nm to 1,000 nm. Further, it is preferable that the minimum value of the thickness tc of the layer of the adhesive 40 between the lid plate 30 and the optical fibers 1a, 1b, 1c, and 1d is 5 nm to 500 nm.

By setting the minimum values of the thicknesses tg and tc of the layer of the adhesive 40 between the V-grooves 21a, 21b, 21c, and 21d and the optical fibers 1a, 1b, 1c, and 1d, and between the lid plate 30 and the optical fibers 1a, 1b, 1c, and 1d in the above ranges, the layer of the adhesive 40 can absorb stress generated due to a difference in coefficient of thermal expansion between the V-groove substrate 20, the lid plate 30, and the adhesive 40 under severe environment, as proved by a test result to the explained later.

Therefore, even when the optical fiber array is exposed in a severe environment for a long time, the V-groove substrate 20, the lid plate 30, and the optical fibers 1a, 1b, 1c, and 1d fixed thereto by the adhesive 40 are not easily peeled off, and optical axes of the optical fibers 1a, 1b, 1c, and 1d are not easily deviated from their initial positions. Therefore, excellent and stably characteristics can be maintained.

That is, if the optical axis of any of the optical fibers 1a, 1b, 1c, and 1d is deviated from a predetermined position, the insertion loss with the connected optical parts is increased. According to the present invention, it is possible to prevent such an increase in the transmission loss.

In the optical fiber array 10, the adhesive 40 is preferably ultraviolet rays-cured type or thermally cured type resin having viscosity before curing in a range of 0.1 to 3.0 Pa·s (100 to 3,000 cP (cps)).

When the viscosity of the adhesive 40 before curing is less than 0.1 Pa·s (100 cP (cps)), since the viscosity is excessively low, it is adversely affected that an ultraviolet rays-curing type resin composite poured into gaps formed between the V-groove substrate 20, the lid plate 30, and the optical fibers 1a, 1b, 1c, and 1d flows out before curing. If the viscosity of the adhesive 40 before curing exceeds 3.0 Pa·s (3,000 cP (cps)), it is adversely affected that the gap is not reliably filled.

It is preferable that the adhesive 40 is ultraviolet rays-cured type or thermally cured type epoxy-based resin having Young's modulus after curing of 500 MPa or higher, and a curing shrinkage ratio of 5% or less.

If an adhesive 40 having such properties is selected, the V-groove substrate 20, the lid plate 30, and the optical fibers 1a, 1b, 1c, and 1d are fixed sufficiently by the adhesive 40. With this, the possibility of cracks or ruptures generating at tip ends of the optical fibers 1a, 1b, 1c, and 1d in handling such as polishing in the processing thereafter can be reduced.

An optical fiber ribbon which is suitably used as the optical fiber in the optical fiber array 10, and its using method will be explained with reference to FIGS. 2 and 3.

In the optical fiber ribbon, a plurality of optical fibers coated with ultraviolet rays-cured type resin are laterally arranged in a line and they are commonly covered. To constitute the optical fiber array 10, coatings of ends of two optical fiber ribbon 1A and 1B are removed, and the optical fibers are alternately disposed and laterally arranged in a line.

Figure 2:
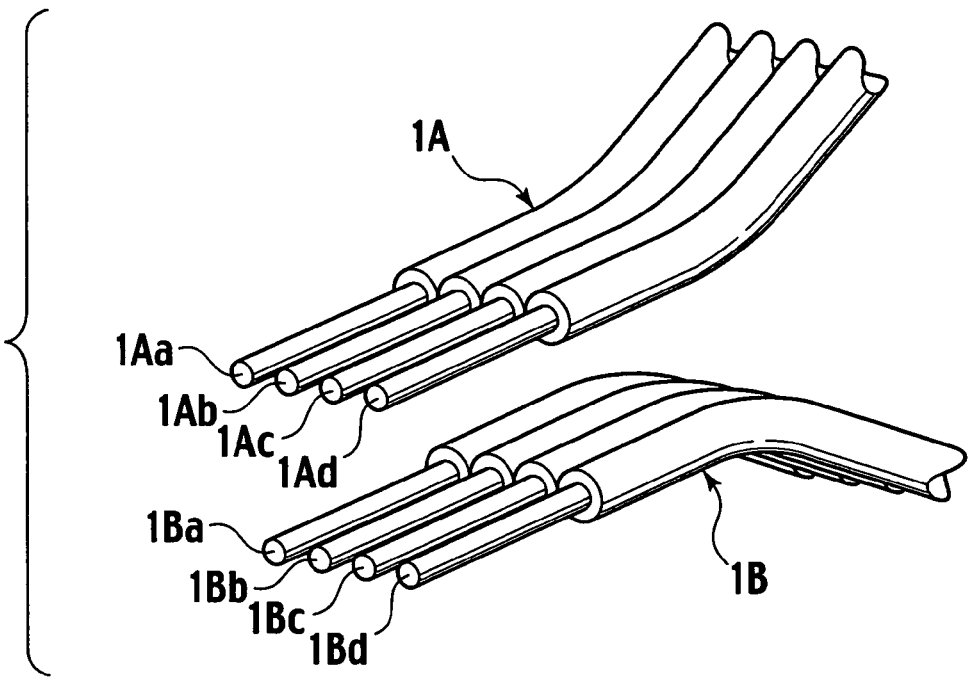
FIG. 2 is perspective view of two optical fiber ribbons.

As shown in FIG. 2 for example, in the case of the optical fiber ribbon 1A having four optical fibers, coatings of ends thereof are removed to form optical fibers 1Aa, 1Bb, 1Ac, and 1Ad. Similarly, in the case of the optical fiber ribbon 1B having four optical fibers, coatings of ends thereof are removed to form optical fibers 1Ba, 1Bb, 1Bc, and 1Bd.

Figure 3:
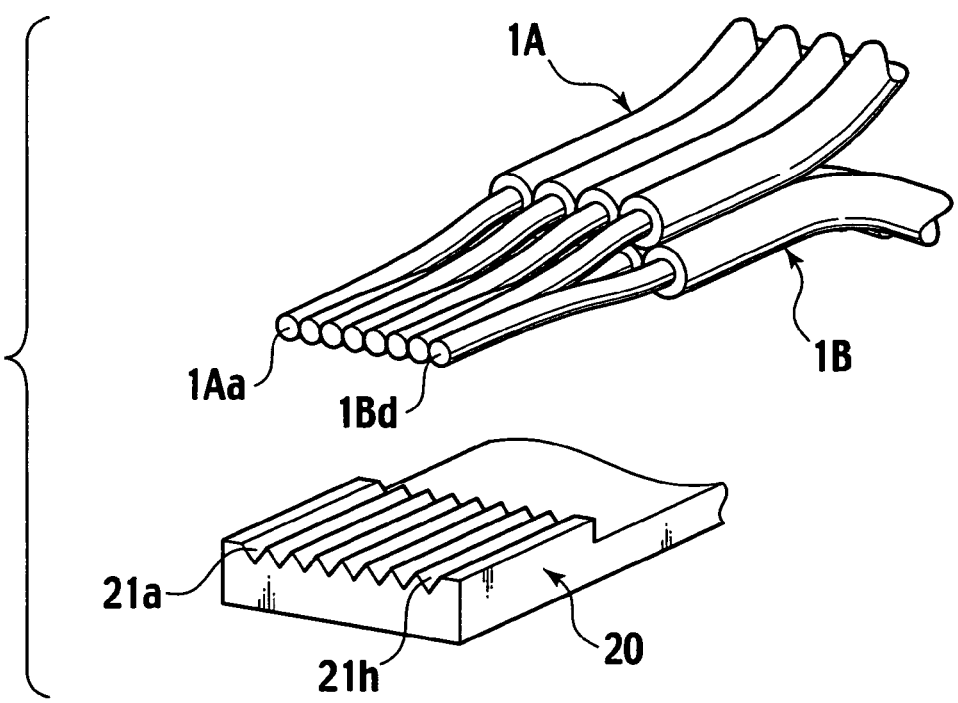
FIG. 3 is a perspective view of an assembling arrangement of the two optical fiber ribbons.

As shown in FIG. 3, the optical fibers 1Aa, 1Ab, 1Ac, and 1Ad of the optical fiber ribbon 1A and the optical fibers 1Ba, 1Bb, 1Bc, and 1Bd of the optical fiber ribbon 1B are alternately disposed to constitute eight optical fibers 1Aa, 1Ba, 1Ab, 1Bb, 1Ac, 1Bc, 1Ad, and 1Bd laterally arranged in line.

Then, the eight optical fibers 1Aa, 1Ba, 1Ab, 1Bb, 1Ac, 1Bc, 1Ad, and 1Bd are disposed one each in at least eight V-grooves 21a to 21h formed in parallel on the V-groove substrate 20, and the lid plate 30 is placed thereon and fixed by the adhesive 40. With this, the optical fiber array 10 having the eight optical fibers 1Aa to 1Bd is formed.

The manufacturing method of the optical fiber array 10 is explained next.

(1) First, the optical fibers 1a, 1b, . . . whose end coatings are removed are aligned in the V-grooves 21a, 21b, . . . formed in parallel on the V-groove substrate 20 in a state where tip ends of the optical fibers project from the end surface of the V-groove substrate 20.

For example, when optical fiber array 10 includes 16 optical fibers 1a to 1p, the V-groove substrate 20 having at least 16 V-grooves 21a to 21p is prepared.

The coatings of the two optical fiber ribbons 1A and 1B having eight optical fibers are removed, optical fibers 1Aa to 1Ah, and 1Ba to 1Bh are exposed by a predetermined length, and they are superposed in upper and lower two stages.

The optical fibers 1Aa to 1Ah, and 1Ba to 1Bh of the superposed two optical fiber ribbons 1A and 1B are alternately and laterally disposed in a line (see FIG. 3), and they are disposed one each in the 16 V-grooves 21a to 21p.

(2) Next, the lid plate 30 is placed on the optical fibers 1a, 1b, . . . , a first load is applied, and the optical fibers 1a, 1b, . . . are sandwiched between the V-groove substrate 20 and the lid plate 30.

When the optical fiber array 10 includes 16 optical fibers 1a to 1p for example, the optical fibers 1Aa to 1Ah, and 1Ba to 1Bh are sandwiched between the V-grooves 21a to 21p and the lid plate 30.

At that time, since the optical fibers 1Aa to 1Bh are bent between the V-grooves 21a to 21p and the lid plate 30, a force to rise from the V-groove due to the rigidity of the optical fiber itself is generated. Hence, a first load by which the optical fibers 1Aa to 1Bh do not come into complete contact with the V-grooves 21a to 21p and the optical fiber rises slightly from the V-grooves is selected while adjusting the distance between the V-groove substrate 20 and the lid plate 30.

(3) Next, the adhesive 40 is applied to tip ends of the optical fibers 1a, 1b, . . . projecting from the V-groove substrate 20 and the lid plate 30, and the adhesive 40 is applied by the surface tension into a space (gap) formed between the lid plate 30 and the V-groove substrate 20 sandwiching the optical fibers 1a, 1b, . . . .

When the optical fiber array 10 includes 16 optical fibers 1a to 1p for example, the adhesive 40 is applied to the projections of the optical fibers 1Aa to 1Bh, and the adhesive 40 is applied into the sandwiching portion by the surface tension.

(4) Next, the adhesive 40 is cured and the optical fibers 1a, 1b, . . . are integrally fixed to the V-groove substrate 20 and the lid plate 30 while applying a second load which is greater than the first load to the lid plate 30.

At this time, a second load by which the optical fibers 1a, 1b, . . . are pressed against the V-grooves 21a, 21b, . . . until the optical fibers 1a, 1b, . . . come into complete contact with the V-grooves 21a, 21b, . . . is selected.

By selecting the first load and the second load, the minimum value of the thicknesses tg and tc of the layer of the adhesive 40 between the V-groove substrate 20, the lid plate 30, and the optical fibers 1a, 1b, . . . becomes 5 nm to 1,000 nm.

By selecting the first load and the second load, the minimum value of the thickness tg of the layer of the adhesive 40 between the V-grooves 21a, 21b, . . . of the V-groove substrate 20 and the optical fibers 1a, 1b, . . . becomes 5 nm to 1,000 nm. Further, the minimum value of the thickness tc of the layer of the adhesive 40 between the lid plate 30 and the optical fibers 1a, 1b, . . . becomes 5 nm to 500 nm.

(5) Next, the projecting tip ends of the optical fibers 1a, 1b, . . . are removed, and the end surfaces of the optical fibers 1a, 1b, . . . are aligned with end surfaces of the V-groove substrate 20 and the lid plate 30.

An environment test (boiling test) was carried out using 40 kinds of samples of the optical fiber array. FIG. 4 is a table showing results of evaluation of a peeling test and transmission characteristics of the environment test. As the samples of the optical fiber array, optical fiber ribbons having different optical fiber geometric parameters were used, the first load and the second load were varied, and the thickness of the layer of the adhesive 40 was varied.

In the peeling test, the optical fiber array was soaked in boiling water, and peeling off state after lapse of predetermined time was observed. Here, o indicates an excellent state where peeling off was not generated (accepted), and x indicates a state where peeling off was generated (rejected).

Concerning the transmission characteristics, an optical fiber array having insertion loss with respect to a reference PLC (Planar Lightwave Circuit) of 0.1 dB or less is indicated by ⊙ (accepted), an optical fiber array having insertion loss of 0.3 dB or less is indicated by o (accepted). an optical fiber array having insertion loss of 0.5 dB or less is indicated by Δ (accepted), and an optical fiber array having insertion loss greater than 0.5 dB is indicated by x (rejected). The measuring wavelength is 1550 nm.

As apparent from the test results shown in FIG. 4, according to the present invention, the high-density and high-precision optical fiber array can stably be manufactured with excellent operability by optimizing the constituent parts of the high-density optical fiber array. It is possible to suppress the insertion loss with respect to optical parts, and excellent characteristics can be maintained.

Even when the optical fiber array of the present invention is kept in a severe environment for a long time, the V-groove substrate, the lid plate, and the optical fiber fixed thereto by the adhesive are not easily peeled off, the optical axis of the optical fiber is less prone to deviate from its initial position, and thus, excellent characteristics can be maintained.

What is claimed is:

1. An optical fiber array comprising:
    a V-groove substrate having a plurality of V-grooves in parallel to each other;
    a lid plate; and
    a plurality of optical fibers which are aligned between the V-grooves and the lid plate, and fixed by an adhesive, wherein
    pitches of the V-grooves are substantially equal to an average outer diameter "d" of the optical fibers, wherein an average value of the pitches of the V-grooves is in a range of 1.0 times to 1.1 times an average value of the outer diameters of the optical fibers;
    a deviation "Δd" of the outer diameter of each optical fiber from the average value "d" of the outer diameters of the optical fibers is 0.3 μm or less;
    a core eccentricity "Δe" of each optical fiber is 0.4 μm or less; and
    a radius of curvature of fiber curl of each optical fiber is 8 meters or more.

2. The optical fiber array according to claim 1, wherein a sum of a core eccentricity "Δe" and a deviation "Δd" from an average value "d" of the outer diameters of each optical fiber is 0.5 μm or less.

3. The optical fiber array according to claim 2, wherein a minimum value of thicknesses of an adhesive layer among the V-groove substrate, the lid plate, and the optical fibers is in a range of 5 nm to 1,000 nm.

4. An optical fiber array comprising:
    a V-groove substrate having a plurality of V-grooves in parallel to each other;
    a lid plate; and
    a plurality of optical fibers which are aligned between the V-grooves and the lid plate, and fixed by an adhesive having a minimum value of thicknesses of an adhesive layer among the V-groove substrate, the lid plate, and the optical fibers is in a range of 5 nm to 1,000 nm, wherein
    pitches of the V-grooves are substantially equal to an average outer diameter "d" of the optical fibers; and
    a radius of curvature of fiber curl of each optical fiber is 8 meters or more, and wherein a minimum value of thicknesses of the adhesive layer between the V-grooves of the V-groove substrate and the optical fibers is in a range of 5 nm to 1,000 nm, and a minimum value of thicknesses of the adhesive layer between the lid plate and the optical fibers is in a range of 5 nm to 500 nm.

5. The optical fiber array according to claim 4, wherein the adhesive is ultraviolet rays cured type or thermally cured type resin having viscosity before curing of 0.1 to 3.0 Pa·s (100 to 3,000 cP (cps)).

6. The optical fiber array according to claim 5, wherein the adhesive is ultraviolet rays cured type or thermally cured type epoxy-based resin having Young's modulus after curing of 500 MPa or higher, and a curing shrinkage ratio of 5% or less.

* * * * *